US012724747B2

(12) United States Patent
Robinson-Morgan et al.

(10) Patent No.: US 12,724,747 B2
(45) Date of Patent: Sep. 1, 2026

(54) SYSTEMS AND METHODS FOR USE IN ESTABLISHING REUSABLE DATA FILES ASSOCIATED WITH USERS

(71) Applicant: MASTERCARD INTERNATIONAL INCORPORATED, Purchase, NY (US)

(72) Inventors: Bryn Anthony Robinson-Morgan, Mosborough Village (GB); Liang Tian, Rye Brook, NY (US); Prashant Sharma, Madison, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 490 days.

(21) Appl. No.: 17/899,488

(22) Filed: Aug. 30, 2022

(65) Prior Publication Data

US 2023/0064932 A1 Mar. 2, 2023

Related U.S. Application Data

(60) Provisional application No. 63/238,982, filed on Aug. 31, 2021.

(51) Int. Cl.
*G06F 16/176* (2019.01)
*H04L 9/40* (2022.01)

(52) U.S. Cl.
CPC ........ *G06F 16/176* (2019.01); *H04L 63/0861* (2013.01)

(58) Field of Classification Search
CPC ... G06F 16/176; G06F 21/32; H04L 63/0861; G06Q 20/3265; G06Q 20/363; G06Q 20/4014
See application file for complete search history.

(56) References Cited

U.S. PATENT DOCUMENTS 9,853,977 B1 12/2017 Laucius et al.
10,554,416 B1 2/2020 Yavuz
(Continued)

FOREIGN PATENT DOCUMENTS

CN 109525583 A 3/2019
EP 2953079 A1 * 12/2015 ............ G06F 21/00
(Continued)

OTHER PUBLICATIONS

"xSTR-ekyc e-KYC use cases in digital financial services", ITU-T Draft; Study Period 2021-2024; Study Group 17, International Telecommunication Union, Geneva ; CH r vol. ties/17; Aug. 30, 2021 (Aug. 30, 2021), pp. 1-32, XP044313607, Retrieved from the Internet: URL:https://www-api.itu.int/ifa/t/2017/sgl 7/docs/210824/td/ties/plen/T17-SG17-210824-TD-PLEN-4081!!ZIP-E.zip TD4081-Att.docx [retrieved on Aug. 30, 2021] section 10.3.1; figure 11.
(Continued)

*Primary Examiner* — Patrice L Winder
(74) *Attorney, Agent, or Firm* — Harness, Dickey & Pierce, P.L.C.

(57) ABSTRACT

Systems and methods are provided for extending data files beyond sources of the data files. One example computer-implemented method includes receiving, from a mobile device of a user, selection of an option to extend a data file compiled at a source party, where the option includes a unique identifier for the user and a source identifier, and soliciting, from the mobile device, an image of the user. The method also includes receiving a captured image of the user from the mobile device and retrieving, based on the unique identifier and the source identifier, the data file from the source party. The method then includes, when the captured image matches the data file, storing the data file as a reusable data file, whereby the data file is available to be provided to
(Continued)

one or more relying parties, different than the source party, upon consent from the user.

16 Claims, 4 Drawing Sheets

(56) References Cited

U.S. PATENT DOCUMENTS 10,685,136 B1* 6/2020 Hecht ................ G06F 21/6245
11,100,572 B1 8/2021 Hecht et al.
11,232,449 B1* 1/2022 Hecht ................ G06Q 20/3674
11,233,799 B1* 1/2022 Whyte .................... G06F 21/44
11,308,189 B2* 4/2022 Sheets ................. H04L 63/0853
11,356,430 B1* 6/2022 Kapczynski ............ H04L 63/08
11,386,223 B1* 7/2022 Fakhraie ............. G06F 21/6245
11,899,815 B1* 2/2024 Fakhraie ............... H04L 63/101
2003/0065576 A1 4/2003 Harris et al.
2007/0124820 A1 5/2007 Burch et al.
2010/0095372 A1 4/2010 Hodgkinson et al.
2010/0185871 A1* 7/2010 Scherrer ............. G06F 21/6218 726/4
2012/0131057 A1 5/2012 Youn et al.
2013/0139229 A1* 5/2013 Fried ....................... H04L 63/08 726/5
2013/0283362 A1 10/2013 Kress et al.
2014/0147020 A1* 5/2014 Baldwin ............ H04N 21/2541 382/118
2014/0230032 A1* 8/2014 Duncan ............... H04L 63/0861 726/7
2015/0363786 A1 12/2015 Kolupaev et al.
2017/0193087 A1* 7/2017 Savliwala ............... H04L 51/18
2017/0251025 A1 8/2017 Varley et al.
2018/0060496 A1 3/2018 Bulleit et al.
2018/0260582 A1* 9/2018 Brouwer ............... H04L 67/306
2019/0149524 A1 5/2019 Bankston et al.
2019/0220898 A1 7/2019 Rhodes et al.
2019/0243956 A1* 8/2019 Sheets ................... G06F 16/903
2019/0312733 A1 10/2019 Engan et al.
2019/0333054 A1 10/2019 Cona et al.
2019/0355065 A1* 11/2019 Ramaratnam .......... G06Q 40/12
2020/0136825 A1 4/2020 Gupta et al.
2020/0250633 A1 8/2020 Vinson et al.
2020/0265046 A1 8/2020 Tang et al.
2020/0374132 A1 11/2020 Lobban et al.
2020/0387624 A1* 12/2020 Dunjic .................. G06F 21/604
2021/0034778 A1 2/2021 Zamir et al.
2021/0057061 A1 2/2021 Bass et al.
2021/0081396 A1 3/2021 Tian et al.
2021/0204120 A1* 7/2021 Nair ...................... H04W 12/63
2021/0258315 A1* 8/2021 Dunjic .................. H04L 63/105
2021/0287770 A1 9/2021 Anderson et al.
2022/0247570 A1 8/2022 Watanabe et al.
2023/0014970 A1 1/2023 Gujarathi et al.
2023/0073938 A1 3/2023 Robinson-Morgan et al.
2023/0077960 A1 3/2023 Robinson-Morgan et al.

FOREIGN PATENT DOCUMENTS

EP 2993619 A1 3/2016
WO WO2019/179533 9/2019

OTHER PUBLICATIONS

Marcos Allende Lopez: “Self-Sovereign Identity The Future of Identity: Self-Sovereignity, Digital Wallets, and Blockchain”, f Sep. 30, 2020 (Sep. 30, 2020), pp. 1-106, XP055805664, Retrieved from the Internet: URL:https://publications.iadb.org/publicat ions/english/document/Self-Sovereign-Ident ity-The-Future-of-Identity-Self-Sovereigni ty-Digital-Wallets-and-Blockchain.pdf [retrieved on May 19, 2021] p. 16-p. 29; figures 2,9.

Digital Identities and Verifiable Credentials, by Fridgen et al., published 2020 (Year: 2020); 11 pgs.

Buldas, A., Truu, A., Laanoja, R., Gerhards, R. (2014). Efficient Record-Level Keyless Signatures for Audit Logs. In: Bernsmed, K., Fischer-Hubner, S. (eds) Secure IT Systems. NordSec 2014. Lecture Notes in Computer Science(), vol. 8788. Springer, Cham. https:/doi.org/10.1007/978-3-319-11599-3_9; (Year: 2014); 16 pgs.

* cited by examiner

SYSTEMS AND METHODS FOR USE IN ESTABLISHING REUSABLE DATA FILES ASSOCIATED WITH USERS

CROSS-REFERENCE TO RELATED APPLICATION

This application claims the benefit of, and priority to, U.S. Provisional Application No. 63/238,982, filed Aug. 31, 2021. The entire disclosure of the above application is incorporated herein by reference.

FIELD

The present disclosure is generally directed to systems and methods for use in establishing reusable data files associated with specific users, and in particular, to repurposing a single-use data file for a first party for use with multiple other parties.

BACKGROUND

This section provides background information related to the present disclosure which is not necessarily prior art.

Users may be associated with data files, which reflect identities of the users. The data files may be specific to particular parties (e.g., particular merchants, etc.), whereby the users establish the data files with the particular parties. In connection therewith, the users are known to provide specified attributes of their identities to the parties, such as, for example, names, addresses, government identifiers, dates of birth, etc., and the parties include the attributes in the data files for the users. As such, the data files are representative of, and include, identities of the users, which are stored with the parties for later use, as needed. For example, a data file at a party, for a user, may include a payment credential specific to the user, whereby a product may be purchased from the party by the user and delivered to the user, without the user having to re-enter data included in the data file (e.g., a shipping address, the payment credential, etc.).

DRAWINGS

The drawings described herein are for illustrative purposes only of selected embodiments and not all possible implementations, and are not intended to limit the scope of the present disclosure.

Figure 1:
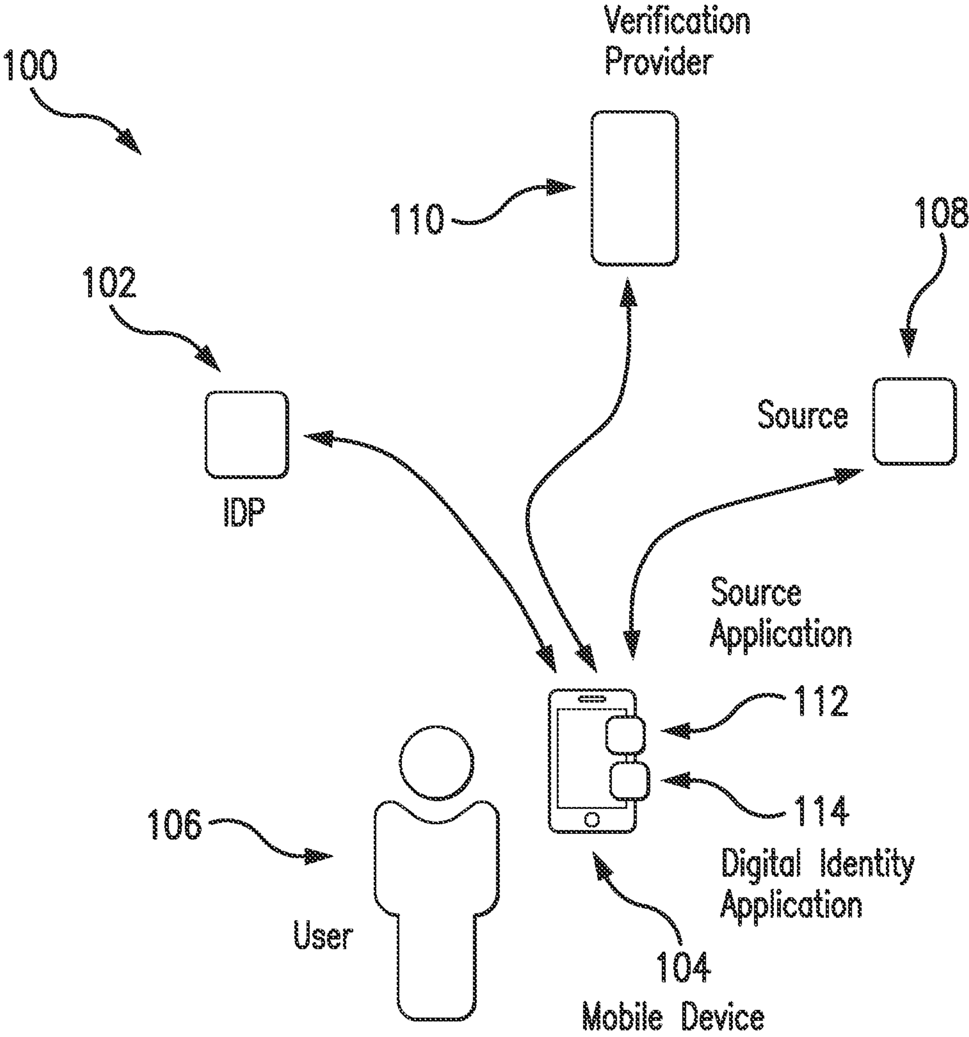
FIG. 1 illustrates an example system of the present disclosure suitable for use in extending data files for users, established with a first party, for use by the associated users with one or more other parties.
Figure 3:
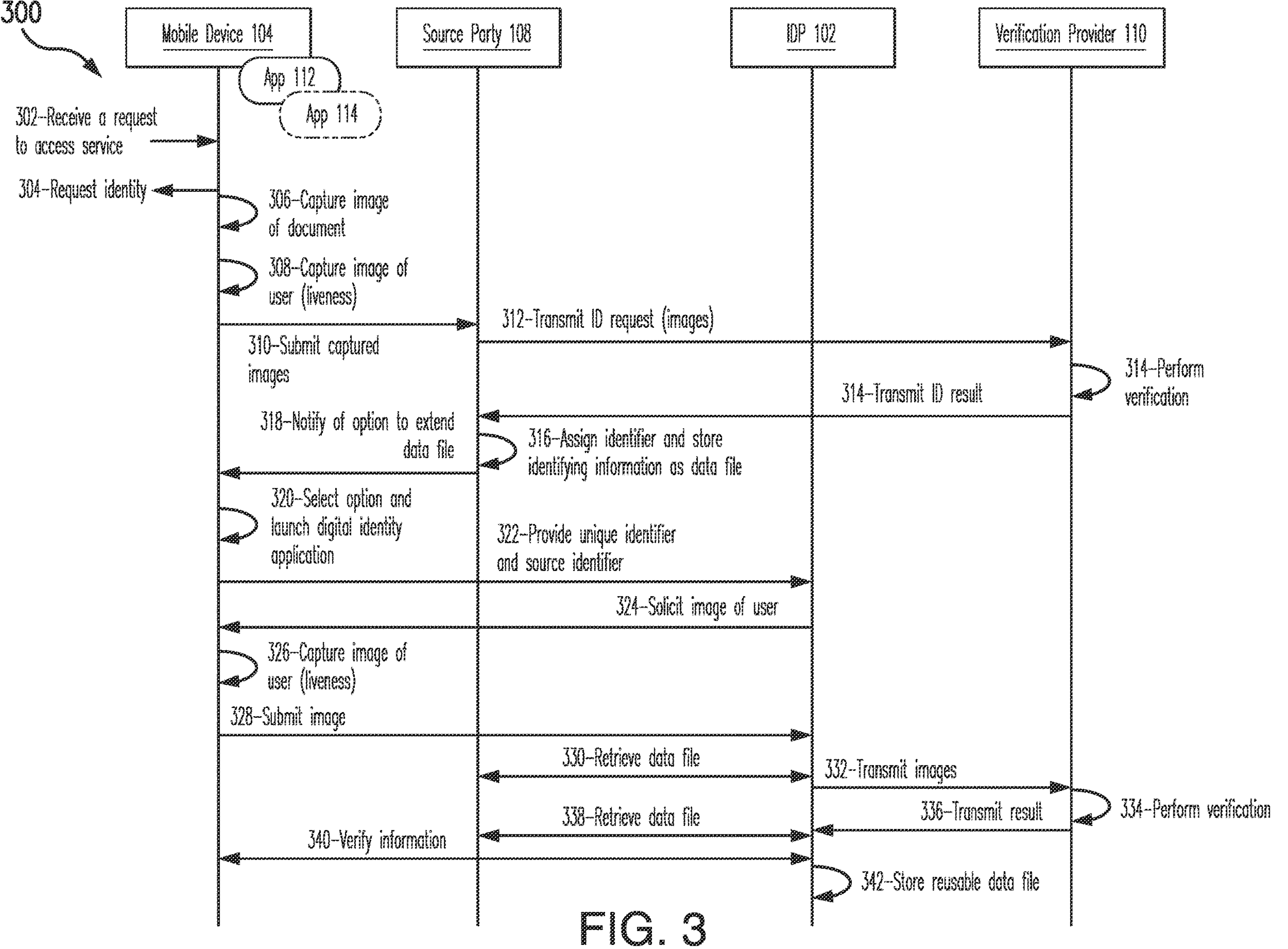
Figure 4:
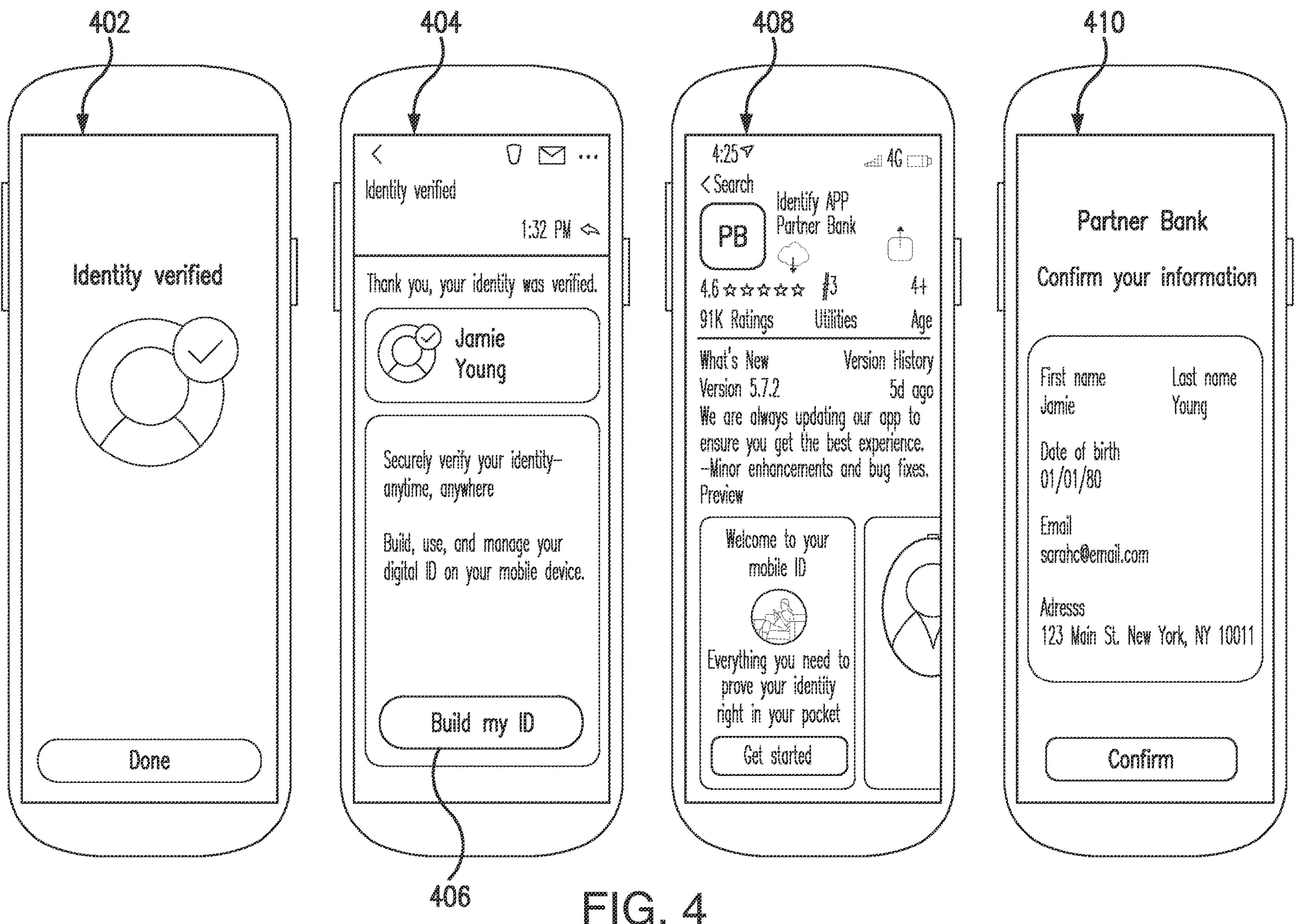

FIG. 3 illustrates an example method, which may be implemented in connection with the system of FIG. 1, for extending use of a data file representative of a user's identity from a first party to at least one additional party, through an identity provider; and FIG. 4 illustrates various example interfaces that may be displayed to a user in connection with the system of FIG. 1 and/or the method of FIG. 3, for extending a data file for the user from a first party to at least one additional party.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

When a user applies for an account with a party, or interacts to purchase a product from the party, or otherwise interacts with the party, etc., based on an identity of the user, the party inputs certain identity data related to the user. For example, when a purchase is initiated, the party may require a payment credential and a shipping address. In connection therewith, the party may invite the user to enroll in a data file or profile with the party, whereby the identity data for the user may be re-used in later interactions, etc. The data file, however, is limited to the specific party, whereby the user is required to similarly enroll with each different party with which that the user needs, or desires, to interact. The re-entry of identifying information is inefficient, and may further provide a security danger of exposing the user's identifying information across multiple different parties, etc.

Uniquely, the systems and methods herein provide for establishing reusable data files for users, by leveraging original data files for the users established with first parties (or source parties or sources) for use with one or more other parties. In particular, an identity provider (IDP) may offer a user an option to extend an enrollment of a data file, as generated at a source party (or source) to other parties as a reusable data file. In connection therewith, upon compilation of the data file, through the source party, an option is presented to the user (e.g., via a source application associated with the source party, etc.), to extend the data file to other parties. Then, upon selection of the option, the IDP requests certain information from the source party, and confirms the identity of the user attempting to extend the data file. Once confirmed or verified, the IDP retrieves additional portions of the data file from the source party, as needed, and stores the data file (or portions thereof), whereby the data file is available to be provided to one or more relying parties, different than the source party, upon consent from the user. In this manner, the data file compiled by the source party is usable with various other parties, to reduce, if not eliminate, the repeated manual disclosure, by the user, of the same identifying information to individual ones of the subsequent relying parties. As such, by extending the data file, the user is permitted to seamlessly link the one data file to other relying parties, as desired.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users and identification providers and/or third parties, particular types of users and/or data associated with the users, particular mobile applications implemented, privacy requirements, etc.

The system 100 generally includes an identification provider (IDP) 102, a mobile device 104 associated with a user 106, a source party 108 (broadly, a source), and a verification provider 110, each of which is coupled to one or more networks to provide communication therebetween. The network(s) is/are indicated generally by arrowed lines in FIG. 1, and each may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The IDP 102 of the system 100 generally is associated with forming and/or managing digital identities associated with users (e.g., for user 106, etc.), and in this example embodiment, for also managing reusable digital identities for the users in the form of data files, based on digital identities generated for the users (and/or existing for the users, etc.) at one or more sources, such as the source party 108.

In connection therewith, the IDP 102 may participate in providing the digital identity for the user 106 to one or more relying parties, as required or requested (e.g., by the user 106, by the relying party, etc.). In FIG. 1, the IDP 102 is illustrated as a standalone service and/or device of the system 100, and is also standalone relative to the source party 108. However, the IDP 102 may additionally, or alternatively, be incorporated in whole or in part with another party in the system 100, such as, for example, a payment network, a business entity, or a banking institution, etc., generally separate from the other entities, as described herein. Specifically, for example, the IDP 102 may be incorporated, in whole or in part, into the Mastercard® payment network and configured to operate as described herein to provide one or more identity-based services to users via and/or in association with the Mastercard® payment network.

In addition, it should be appreciated that while the IDP 102 is illustrated as a single entity and/or computing device in FIG. 1, the IDP 102 may be segregated into multiple different entities and/or computing devices in other embodiments, with data being distributed and/or exchanged therebetween, so that the IDP 102, overall, is still configured to operate as described herein (but includes a distributed configuration, etc.).

The mobile device 104 of the system 100 includes a smartphone, tablet, PDA, smartwatch, laptop, etc., or other computing device that is generally considered portable with the user 106, when the user 106 moves from location to location. In addition, the mobile device 104 may include software, one or more application, one or more browser extension or similar executable instructions, which configure the mobile device 104 as described herein. In at least one embodiment, though, the mobile device 104 may be replaced by an immobile computing device associated with the user 106, whereby the mobile device 104 may be more generally referenced to herein as a computing device or communication device.

The source party 108, in this example embodiment, includes a first party, with which the user 106 may interact, whereby the user 106 communicates identifying information to the source party 108 for one or more reasons, for example, relating to an interaction between the user 106 and the source party 108, etc. In connection therewith, the source party 108 may include, for example, a financial provider (e.g., a banking institution, an investment house, etc.), a medical provider, a merchant, a social network host, a service provider (e.g., related to ridesharing, delivery, telecommunications, utilities, plumbing, etc.), etc. In general, then, the user 106 may enroll with the source party 108, for one or more reasons (e.g., as part of the desired interaction, etc.), and in doing so, provide identifying information, such as, for example, a name, address, contact information, biometric(s), government ID, other identifiers (e.g., insurance numbers, employee ID numbers, etc.), etc., as part of the enrollment, as described in more detail below.

The verification provider 110 includes an entity, or service, associated with verification of information related to users, including the user 106, for example, in connection with the provisioning or extending of a digital identity, or data file representative thereof, to or for the user 106. In the illustrated embodiment, in connection with the provisioning of a digital identity to (or for) the user 106 (or extending such digital identity), the verification provider 110 is configured to perform a biometric verification of the user 106, for example, between an image of a document (e.g., provided by the user 106 as a basis for identifying the user 106, etc.) and a biometric (e.g., a facial image or selfie, etc.) for the user 106, etc. Additionally, or alternatively, the verification provider 110 may be configured to verify the user 106 based on other information about the user 106, as provided from or retrieved from, a party seeking the verification (e.g., the source party 108, the IDP 102, etc.) (e.g., based on a biometric provided by the IDP 102, etc.) or other party (e.g., based on information from an agency issuing a document received by the verification provider 110, etc.). In other embodiments, the verification provider 110 may be configured to authenticate the user 106 in other manners. For example, the verification provider 110 may be configured to authenticate the user 106 based on a trusted source of their identity, for example, through a customer authentication (or login) setup at a financial institution for an account of the user 106 (whereby the financial institution may be the source party 108, etc.) (e.g., under an open banking type service that verifies a name and date of birth of the user 106, etc.), or through cryptographic verification of a token (e.g., via Chip & PIN of a payment card, NFC read of a passport/identity card, verification of a Mobile Station International Subscriber Directory Number (MSISDN) using a device SIM to obtain identity information of the user, etc.).

In this example embodiment, the verification provider 110 is illustrated as separate from the IDP 102, yet should be understood to be included in part or in whole with the IDP 102, or potentially, separate therefrom.

Figure 2:
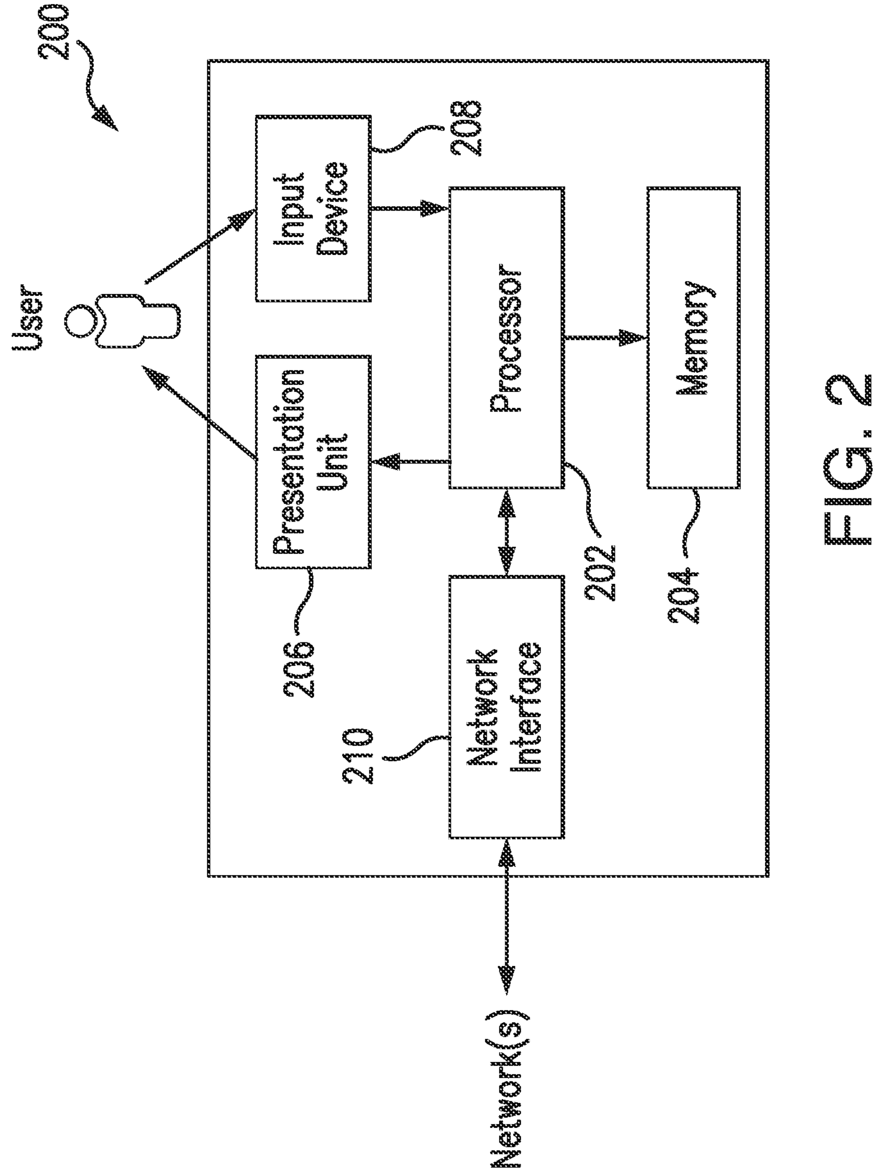
FIG. 2 is a block diagram of a computing device that may be used in the example system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the IDP 102, the mobile device 104, the source party 108, the verification provider 110 should be understood to include, or as being implemented or embodied in, a computing device at least partially consistent with the computing device 200, coupled to (and in communication with) one or more of the networks. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data related to identities of users, biometrics, and/or other types of data (and/or data structures) suitable for use as described herein. Furthermore, in various embodiments, computer-executable instructions (e.g., in the form of applications (e.g., application 112, application 114, etc.), etc.) may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., prompts to the user 106 at the mobile device 104, etc.), etc. And various interfaces (e.g., as defined by the applications 112, 114, etc.) (e.g., including instructions to the user 106, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as, for example, selections of parties, images of documents, biometrics, etc., in response to prompts, as further described below. The input device 208 may include a single input device or multiple input devices. The input device 208 is coupled to (and is in communication with) the processor 202 and may include, for example, one or more of a keyboard, a pointing device, a mouse, a stylus, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different ones of the networks herein and/or with other devices described herein. In some example embodiments, the computing device 200 may include the processor 202 and one or more network interfaces incorporated into or with the processor 202.

With reference again to FIG. 1, the system 100 provides for provisioning of a data file, in the form of a digital identity, for the user 106, at the source party 108, and then extending the data file to the IDP 102 as a reusable data file.

In particular, the user 106 interacts with the mobile device 104 to provision the data file (in the form of the digital identity for the user 106), at or to the source party 108. In connection therewith, in the embodiment of FIG. 1, the mobile device 104 includes source application 112 and digital identity application 114. The source application 112 configures the mobile device 104 to communicate with the source party 108 and/or to operate as described herein. In addition, the source application 112 may include a software development kit (SDK), or other code or part, which is/are specific to the IDP 102 and/or the digital identity application 114, as described below, whereby the source application 112 may configure the mobile device 104 to transform from creating/starting/collecting a data file to extending the data file to the IDP 102, etc. It should be appreciated that, while the source application 112 is included in this example embodiment, the mobile device 104 may instead access a source website associated with the source party 108 in other embodiments (whereby the source website configures the mobile device 104 to communicate/operate similar to the source application 112). What's more, it should be appreciated that operations described herein with reference to the mobile device 104 and the source party 108 may, at least in part, be in either the source application 112 (to configure the mobile device 104 to operate accordingly), or in the source party 108, or various combinations thereof.

In turn, the mobile device 104, as configured by the source application 112, solicits an identity from the user 106 in connection with the user 106 attempting to access a service associated with the source party 108 or to otherwise interact with the source party 108. In response, the user 106 provides an image of himself/herself, as a selfie, at the mobile device 104. In connection therewith, the mobile device 104, as configured by the source application 112, captures the image of the user 106 and also performs, in this example, a liveness verification (e.g., to confirm the image is an image of the user 106 and not an image of an image of the user 106, etc.). The mobile device 104, as configured by the source application 112, then also captures an image of a physical document of the user 106 indicative of an identity of the user 106 (e.g., a passport, a driver's license, or other government issued ID, a social security card, a health insurance card, an employee ID, a utility bill, etc., generally, which includes a biometric, such as a facial image for the user 106; etc.).

The mobile device 104, as configured by the source application 112, transmits the image of the user 106 and the image of the document to the source party 108. The source party 108, in turn, is configured to verify the user 106, via the images, with the verification provider 110. In particular, the verification provider 110 is configured to receive the images, to compare the facial image of the user 106 (e.g., selfie, etc.) to a part of the image of the document including the user's facial image, and to verify the user 106, and certain information about the user 106, when the comparison reveals a match. The verification provider 110 is configured to not verify the user 106, when the comparison reveals no match.

When the user 106 is not verified by the verification provider 110, the source party 108 is configured to halt interactions with the user 106, or otherwise issue a fail notice.

Conversely, when the user 106 is verified, the source party 108 is configured to store a data file, including the information about the user 106 relating to the user's digital identity, in a memory (e.g., the memory 204, etc.) and to generate a unique code for the data file and/or the user 106, which is also stored in the data file. Next, the source party 108 is configured to notify the user 106 of an option to extend the data file, or classify the data file, as a reusable data file, through the IDP 102. In connection therewith, the source party 108 may be configured to notify the user 106 of the option, via the source application 112, whereby the option is displayed to the user 106 at the mobile device 104 (and the option is linked to the unique code for the data file as well as a source identifier). Alternatively, the source party 108 may be configured to notify the user 106 via an email or SMS message, etc., which again includes the option linked as described above.

When the user 106 opts to accept the option to extend his/her data file as a reusable data file, the user 106 selects the option at the mobile device 104 (e.g., a deferred deep link option, etc.). In response, the mobile device 104 is configured to determine whether the digital identity application 114 is installed in the mobile device 104, and to launch the digital identity application 114 at the mobile device 104 (when installed) to specify enrollment content for the IDP 102. In this embodiment, when the digital identity application 114 is determined not to be installed, the mobile device 104 is configured to install the application 114 (e.g., via an application store application, etc.), and then, to open the application 114 to receive the specific content for enrollment. In either instance, the source identifier and the unique code for the user's data file is passed to the digital identity application 114. It should be appreciated that the digital identity application 114 is associated with the IDP 102, and configures the mobile device 104 to participate in certain operations specific to the digital identity or data file of the user 106 (e.g., provision a digital identity, manage a digital identity, share a digital identity with a relying party, etc.).

The mobile device 104, as configured by the digital identity application 114, next captures an image of the user 106 (e.g., a selfie, etc.) (and performs a liveness verification in connection therewith), and submits the image, along with the source identifier and the unique code, to the IDP 102.

In this example embodiment, the IDP 102 is configured to request a portion of the data file from the source party 108, sufficient to verify the image from the mobile device 104 (e.g., an image of the user 106 and/or the physical document included in the data file, etc.), whereupon, the source party 108 is configured to provide the requested portion of the data file. The IDP 102 is configured to then submit the image and the portion of the data file to the verification provider 110. In turn, the verification provider 110 is configured to verify the user 106, again, based on the images, and to verify the user 106 with the IDP 102, when there is a match.

The IDP 102 is configured to then retrieve the data file, or additional portions, as needed, from the source party 108. The IDP 102 is configured to transmit the data file to the mobile device 104. The mobile device 104, as configured by the digital identity application 114, displays at least a portion of the data file to the user 106 for confirmation. The mobile device 104, as configured by the digital identity application 114, receives a confirmation input from the user 106, and creates the data file as a reusable data file for the user 106, which may be provided to various relying parties (beyond the source party 108) as requested by the relying parties and/or the user 106.

FIG. 3 illustrates an example method 300 for use in extending data files as reusable data files for users. The example method 300 is described as implemented in the IDP 102, the mobile device 104, and the source party (or source) 108 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

At the outset in the method 300, the user 106 decides to interact with the source party 108, whereby at least part of the identity of the user 106 is required for the interaction. In connection therewith, the user 106 accesses the source application 112, at the mobile device 104. And, the mobile device 104 receives, from the user 106, at 302, a request to access a service, for example, related to the interaction with the source party 108, etc. (e.g., a specific service (e.g., a banking, medical, telecommunication, personal, retail, etc. service), an account service, a scheduling service or task, etc.).

In turn, the mobile device 104 (by the source application 112) requests proof of the identity of the user 106, at 304. The request may provide a specific instruction as to the form of the identity, whether through a physical document, a biometric, etc. In this example embodiment, the mobile device 104 requests that the user 106 capture an image of a physical document, such as, for example, a passport, driver's license, etc., and also capture an image (e.g., a selfie image, etc.) of the user 106, etc. In response, the user 106 presents the document, and the mobile device 104 captures, at 306, an image of the document. It should be appreciated that the mobile device 104, in connection therewith, may employ one or more verification techniques, to ensure the document presented is a whole, complete document (and not a document with a different user image, or different information placed thereon, etc.). For example, the mobile device 104 may perform a visual verification of the document by confirming that particular security features, typeface, check digits, expiry dates, etc. are present and/or are located at appropriate locations based on a type of the document. Additionally, or alternatively, the mobile device 104 may communicate with an issuer of the document (or other authorized party) and request a validity check for the document.

At 308, the mobile device 104 captures an image of the user 106, and in this example, an image of the face of the user 106 (e.g., a selfie, etc.). It should be appreciated that other biometrics may be captured by the mobile device 104 in other examples. Generally, however, the biometric will be consistent with a biometric available either from the physical document or from, for example, the verification provider 110, etc. In connection with the image capture, the mobile device 104 provides for a liveness verification (e.g., ensuring some movement or image transition in connection with capturing the image of the user 106 and/or the biometric from the user 106, etc.) to ensure the image being captured is of a live person, and not of a picture.

In addition to the images, the user 106 may provide identifying information, such as, a name, an address, etc., and may also provide consent to verify the information provided, either internally by the source party 108 or through one or more third parties (e.g., the verification provider 110, etc.).

Next in the method 300, at 310, the mobile device 104 (by the source application 112) submits the images, and other pertinent identifying information, to be verified, to the source party 108. In turn, the source party 108 transmits an ID request to the verification provider 110, at 312, including, for example, the images received from the mobile device 104. The verification provider 110 then performs, at 314, verification of the user 106, via the images(s) included in the request. For example, the verification provider 110 may compare the image of the user 106 to the image of the physical document, and specifically, to an image of the user 106 included in the physical document. A match indicates that the user 106 is verified, while a mismatch indicates the user 106 is not verified. In addition, the verification provider 110 may extract text from the physical document image, and also make other suitable comparisons, etc., with an issuing authority of the document, etc., to verify other identifying information included in the ID request, as needed or desired. That said, as described above, the identity of the user 106 may be verified in other manners within the scope of the present disclosure, for example, via login credentials to an account maintained for the user 106 at the verification provider 110, via cryptographic verification of a token, etc.

Once the user 106 is verified, or not, the verification provider 110 transmits, at 314, an ID result to the source party 108, which indicates a verified or not verified result. When not verified, the method 300 ends, and the user 106 is informed that his/her identity was not verified (e.g., by the source party 108 via the source application 112, by the source party 108 via an SMS message to the mobile device 104, etc.). Conversely, when verified, the source party 108 assigns, at 316, an identifier to the user 106 and stores the identifying information about the user 106 (i.e., received from the user 106 via the source application 112 and/or verified by the verification provider 110) as a data file in memory (e.g., memory 204, etc.), as a verified digital identity for the user 106. FIG. 4 illustrates an interface 402 that may be displayed to the user 106, by the source application 112, at the mobile device 104, which confirms the user's identity has been verified and, then, that the identifying information provided by the user 106 has been also stored as a data file by the source party 108.

Uniquely, then, in the method 300, the source party 108 transmits, at 318, a notification to the user 106 at the mobile device 104 (via the source application 112), which includes an invitation to extend the data file just created beyond the source party 108 for use with other relying parties, through the IDP 102. The invitation includes a link, which is associated with the unique identifier for the user 106 (as assigned in step 316) (or with a different identifier unique to the user 106) and a source identifier, etc. FIG. 4 illustrates an example interface 404 that may be displayed to the user 106, by the source application 112, at the mobile device 104, which includes an invitation or option 406 to extend the data file for the user 106 as a digital identity through the IDP 102. At 320, in the method 300, the user 106 selects the option or invitation and, in response, the mobile device 104 launches the digital identity application 114.

It should be appreciated that the option included in the notification from the source 108 (at 318) may include a deep link, which is linked to the digital identity application 114, even if not installed in the mobile device 104 (as indicated by the dotted border around "App 114" in FIG. 3). Consequently, when the option (or deep link) is selected, in step 320, the mobile device 104 will launch the digital identity application 114 when installed or, when not installed, navigate to an interface through which the digital identity application 114 may be downloaded and installed at the mobile device 104. In connection therewith, FIG. 4 illustrates an example interface 408 that may be displayed to the user 106, by the source application 112, at the mobile device 104, with an option to download and install the ID application (e.g., the digital identity application 114, etc.), for example, from an App Store, etc. (e.g., where the ID application may be provided by Partner Bank, etc.). In response, when the digital application is not installed, the user 106 selects the digital identity application 114 and downloads and installs the same, whereby the digital identity application 114 is launched in the mobile device 104.

In either instance, when launched, the mobile device 104 (by the digital identity application 114) provides an interface to the user 106 to extend the data file (compiled with the source party 108) as a reusable data file for use with various relying parties.

As part of a session with the digital identity application 114, at 322, the mobile device 104 provides the unique identifier for the user 106 and the source identifier for the source party 108 to the IDP 102. In response, the IDP 102 solicits, at 324, an image of the user 106, via the mobile device 104, for use in verifying the user 106. In connection therewith, the mobile device 104 captures, at 326, an image of the user 106, and in this example, the face of the user 106 (e.g., a selfie, etc.). As part of the image capture, the mobile device 104 may again provide for a liveness verification (as described above). The mobile device 104 then submits, at 328, the captured image to the IDP 102.

In turn, the IDP 102 retrieves, at 330, the data file, or a portion thereof, from the source party 108 based on the unique identifier and the source identifier for the source party 108. The IDP 102 then submits, at 332, the captured image (from steps 326 and 328), and an image included in the data file, or portion thereof, from the source party 108 (e.g., an image of a document associated with the user 106, etc.) to the verification provider 110. At 334, the verification provider 110 performs verification of the images, for example, by comparing the images, and then, at 336, transmits a result of the verification to the IDP 102, where the result is either a match or verification, or not. Again, as described above, the identity of the user 106 may be verified in other manners within the scope of the present disclosure (other than comparison of images), for example, via login credentials to an account maintained for the user 106, via cryptographic verification of a token, etc. When the user 106 is not verified, the method 300 ends, and the IDP 102 notifies the user 106 that his/her identity was not verified (e.g., via the digital identity application 114, via a SMS message to the mobile device 104, etc.). However, when matched/verified, the IDP 102 retrieves, at 338 any additional portions of the data file, from the source party 108, as needed or desired, and, at 340, verifies the information included in the data file with the user 106, at the mobile device 104. In particular, the IDP 102, via the digital identity application 114, may display the information to the user 106 and request a verification input for some or all of the information, collectively, or separately. FIG. 4, for example, illustrates an example interface 410 that may be displayed to the user 106, by the source application 112, at the mobile device 104, which includes identifying information to be confirmed by the user 106.

And, when the user 106 confirms the identifying information for the data file, the IDP 102 stores, at 342, the data file as a reusable data file in memory (e.g., the memory 204, etc.), whereby the reusable data file is accessible to the user 106, via the digital identity application 114 or otherwise, or by relying parties with consent from the user 106.

In view of the above, the systems and methods herein provides for extending a data file for a user to additional relying parties, beyond the original source of the data file. In this manner, friction associated with provisioning a data file for a user to multiple, different relying parties may be reduced, and network traffic associated with the repeat provisioning of such files (and related identifying data) to different parties may be reduced.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device, from a mobile device associated with a user, a selection of an option to extend a data file compiled at a source party, the option including a unique identifier for the user and a source identifier; (b) soliciting, by the computing device, from the mobile device, an image of the user; (c) receiving, by the computing device, a captured image of the user from the mobile device; (d) retrieving, by the computing device, based on the unique identifier and the source identifier, at least a portion of the data file from the source party; and (e) when the captured image from the mobile device matches the at least a portion of the data file, storing the data file as a reusable data file, whereby the data file is available to be provided to one or more relying parties, different than the source party, upon consent from the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" as well as the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in extending a data file for a user to at least one party, beyond a source of the data file, the method comprising:

receiving, by a computing device, from a mobile device of a user, a selection of an option, from a source application in the mobile device, to extend a data file for the user compiled at a source party to one or more relying parties, the option including a unique identifier for the user assigned by the source party and a source identifier specific to the source party, the source party being separate from the user and the one or more relying parties, the data file including identifying information, which includes a name of the user and an address of the user, contact information of the user, and/or a government identifier specific to the user;

soliciting, by the computing device, from the mobile device, an image of the user;

receiving, by the computing device, from the mobile device, the source identifier and the image of the user captured by the mobile device;

retrieving, by the computing device, based on the unique identifier and the source identifier, at least a portion of the data file from the source party; and based on the captured image from the mobile device matching the at least a portion of the data file, storing the data file as a reusable data file, wherein the data file is available to be provided to the one or more relying parties, different than the source party, upon consent from the user.

2. The computer-implemented method of claim 1, wherein the image of the user includes a facial image of the user.

3. The computer-implemented method of claim 1, further comprising:

transmitting, to a verification provider, the captured image of the user and an image from the at least a portion of the data file retrieved from the source party; and receiving a result from the verification provider, indicating a match between the captured image of the user and the image included in the at least a portion of the data file.

4. The computer-implemented method of claim 3, wherein the at least a portion of the data file retrieved from the source party includes a portion of the data file comprising less than all of the data file; and wherein the method further comprises retrieving, by the computing device, an additional portion of the data file, after receiving the result from the verification provider.

5. The computer-implemented method of claim 4, wherein storing the data file as the reusable data file includes storing the portion of the data file comprising less than all of the data file and the additional portion of the data file in a memory of the computing device.

6. The computer-implemented method of claim 1, further comprising, prior to receiving the selection of the option to extend the data file, causing the option to extend the data file to be displayed to the user at the mobile device by the source application associated with the source party.

7. The computer-implemented method of claim 6, wherein the option to extend the data file includes a deep link to a digital identity application.

8. A computer-implemented method for use in extending a data file for a user to at least one party, beyond a source of the data file, the method comprising:

receiving, by a computing device, from a mobile device of a user, a selection of an option, from a source application in the mobile device, to extend a data file for the user compiled at a source party to one or more relying parties, the option including a unique identifier for the user assigned by the source party and a source identifier specific to the source party, the source party being separate from the user and the one or more relying parties, the data file including identifying information, which includes a name of the user and an address of the user, contact information of the user, and/or a government identifier specific to the user;

retrieving, by the computing device, based on the unique identifier and the source identifier, at least a portion of the data file from the source party;

verifying an identity of the user, based on the at least a portion of the data file; and in response to verifying the identity of the user, storing the data file as a reusable data file, wherein the data file is available to be provided to the one or more relying parties, different than the source party, upon consent from the user.

9. The computer-implemented method of claim 8, wherein verifying the identity of the user includes:

soliciting, by the computing device, from the mobile device, an image of the user;

receiving, by the computing device, from the mobile device, an image of the user captured by the mobile device; and comparing the captured image from the mobile device to the at least a portion of the data file.

10. The computer-implemented method of claim 9, wherein verifying the identity of the user includes one of verifying login credentials to an account maintained for the user and/or cryptographic verification of a token.

11. A non-transitory computer-readable storage medium comprising executable instructions for use in extending a data file for a user to at least one party, beyond a source of the data file, which when executed by at least one processor of a computing device, cause the at least one processor to:

receive, from a mobile device of a user, a selection of an option, from a source application in the mobile device, to extend a data file of a source party for the user compiled at the source party to at least one relying party, the option including a unique identifier for the user assigned by the source party and a source identifier specific to the source party, the source party being separate from the user and the one or more relying parties, the data file including identifying information, which includes a name of the user and an address of the user, contact information of the user, and/or a government identifier specific to the user;

solicit, from the mobile device, an image of the user;

receive, from the mobile device of the user, the source identifier and the image of the user captured by the mobile device;

retrieve, based on the unique identifier and the source identifier, at least a portion of the data file from the source party; and when the captured image from the mobile device matches the at least a portion of the data file, store the data file as a reusable data file, wherein the data file is available to be provided to the at least one relying party, different than the source party, upon consent from the user.

12. The non-transitory computer-readable storage medium of claim 11, wherein the image of the user includes a facial image of the user.

13. The non-transitory computer-readable storage medium of claim 11, wherein the executable instructions, when executed by the at least one processor, further cause the at least one processor to:

transmit, to a verification provider, the captured image of the user and an image from the at least a portion of the data file retrieved from the source party; and receive a result from the verification provider, indicating a match between the captured image of the user and the image included in the at least a portion of the data file.

14. The non-transitory computer-readable storage medium of claim 13, wherein the at least a portion of the data file retrieved from the source party includes a portion of the data file comprising less than all of the data file; and wherein the executable instructions, when executed by the at least one processor, further cause the at least one processor to retrieve an additional portion of the data file, after receiving the result from the verification provider.

15. The non-transitory computer-readable storage medium of claim 14, wherein the executable instructions, when executed by the at least on processor, further cause the at least one processor, in storing the data file as the reusable data file, to store the portion of the data file comprising less than all of the data file and the additional portion of the data file in a memory of the computing device.

16. The non-transitory computer-readable storage medium of claim 11, wherein the executable instructions, when executed by the at least one processor, further cause the at least one processor to, prior to receiving the selection of the option to extend the data file, cause the option to extend the data file to be displayed to the user at the mobile device by the source application, which is associated with the source party; and wherein the option to extend the data file, as displayed to the user at the mobile device by the source application, includes a deep link to a digital identity application.

* * * * *